US008985343B1

(12) United States Patent
Mohr

(10) Patent No.: US 8,985,343 B1
(45) Date of Patent: Mar. 24, 2015

(54) METHOD AND APPARATUS FOR SEPARATING IMMISCIBLE LIQUIDS AND SOLIDS FROM LIQUIDS

(71) Applicant: Kirby Smith Mohr, Oak Point, TX (US)

(72) Inventor: Kirby Smith Mohr, Oak Point, TX (US)

( * ) Notice: Subject to any disclaimer, the term of this patent is extended or adjusted under 35 U.S.C. 154(b) by 0 days.

(21) Appl. No.: 14/162,858

(22) Filed: Jan. 24, 2014

(51) Int. Cl.
| B01D 12/00 | (2006.01) |
| B01D 17/00 | (2006.01) |
| B01D 43/00 | (2006.01) |
| C02F 1/40 | (2006.01) |
| B01D 17/02 | (2006.01) |
| C02F 1/00 | (2006.01) |
| B01D 21/00 | (2006.01) |
| B01D 24/00 | (2006.01) |
| B01D 29/00 | (2006.01) |

(52) U.S. Cl.
CPC . *C02F 1/40* (2013.01); *Y10S 210/05* (2013.01)
USPC .......... 210/521; 210/522; 210/799; 210/802; 210/803; 210/DIG. 5

(58) Field of Classification Search
None
See application file for complete search history.

(56) References Cited

U.S. PATENT DOCUMENTS

| 2,207,399 | A | 7/1940 | Gaertner |
| 2,497,392 | A | 2/1950 | Breukel |
| 2,673,451 | A | 3/1954 | Gariel |
| 2,868,384 | A | 1/1959 | Puddington |
| 3,346,122 | A | 10/1967 | Cornelissen |
| 3,348,466 | A | 10/1967 | Lane et al. |
| 3,358,580 | A | 12/1967 | Freese et al. |
| 3,385,439 | A | 5/1968 | Bach |
| 3,399,135 | A | 8/1968 | Conely, Jr et al. |
| 3,552,554 | A | 1/1971 | Olgard |
| 3,563,389 | A | 2/1971 | Mizrahi et al. |
| 3,698,562 | A | 10/1972 | Farrow et al. |
| 3,741,401 | A | 6/1973 | Hsiung |
| 3,768,648 | A | 10/1973 | Anderson et al. |
| 3,847,813 | A | 11/1974 | Castelli |
| 3,915,858 | A | 10/1975 | Condolios |
| 3,957,656 | A | 5/1976 | Castelli |
| 4,028,256 | A | 6/1977 | Pielkenrood |
| 4,046,698 | A | 9/1977 | Pielkenrood |
| 4,054,529 | A | 10/1977 | Pielkenrood |
| 4,122,017 | A | 10/1978 | Tanabe et al. |

(Continued)

FOREIGN PATENT DOCUMENTS

| CA | 1001961 A1 | 12/1976 |
| CA | 1062173 A1 | 9/1979 |

(Continued)

*Primary Examiner* — Allison Fitzsimmons
*Assistant Examiner* — Clare Perrin
(74) *Attorney, Agent, or Firm* — J. Oliver Williams

(57) ABSTRACT

A separator plate is used for separating immiscible liquids and solids from a liquid mixture. The oil water separator plate is composed of bi-directional corrugations extending in both lateral and longitudinal directions, thereby forming a plurality of peaks and valleys. A ramp extends from each peak to the neighboring valleys. An elongated oil port is formed in the peak for passing immiscible liquids that disengage from the liquid mixture. The oil port includes a tip portion angled approximately vertically from horizontal. Solids disengaged from the liquid mixture translate through a solids aperture. Fences are included along the lower surface of the plate to guide rising immiscible liquid. The separator plate is configured for stacking by selectively engaging a pin with one of a number of sockets in another plate. The pin and sockets permit varied vertical spacing and alignment in both lateral directions and longitudinal directions.

17 Claims, 3 Drawing Sheets

(56) References Cited

U.S. PATENT DOCUMENTS

| | | |
|---|---|---|
| 4,132,651 A | 1/1979 | deJong |
| 4,133,758 A | 1/1979 | Davis et al. |
| 4,194,976 A | 3/1980 | Robinsky |
| 4,273,654 A | 6/1981 | Pielkenrood |
| 4,278,545 A | 7/1981 | Batutis et al. |
| 4,400,280 A | 8/1983 | Larsson et al. |
| 4,405,459 A | 9/1983 | Smith |
| 4,435,196 A | 3/1984 | Pielkenrood |
| 4,437,988 A | 3/1984 | James |
| 4,589,983 A | 5/1986 | Wydevan |
| 4,643,834 A * | 2/1987 | Batutis .......... 210/740 |
| 4,897,206 A * | 1/1990 | Castelli .......... 210/791 |
| 4,941,977 A | 7/1990 | Cornelissen |
| 4,980,070 A | 12/1990 | Lieberman |
| 5,246,592 A | 9/1993 | Schweizer et al. |
| 5,296,150 A | 3/1994 | Taylor, Jr. |
| 5,500,132 A | 3/1996 | Elmi |
| 5,730,878 A | 3/1998 | Rice |
| 5,762,810 A * | 6/1998 | Pelton et al. .......... 210/799 |
| 6,079,571 A | 6/2000 | Stowell |
| 6,517,719 B1 | 2/2003 | Burwell |
| 6,659,290 B1 | 12/2003 | Lawson et al. |
| 6,730,236 B2 * | 5/2004 | Kouba .......... 210/806 |
| 6,817,476 B2 | 11/2004 | Donnick, Jr. et al. |
| 6,833,214 B2 | 12/2004 | Funatsu et al. |
| 7,021,471 B2 | 4/2006 | Abrams |
| 7,316,657 B2 | 1/2008 | Kleinhenz et al. |
| 7,470,361 B2 | 12/2008 | Eberly |
| 7,780,855 B2 | 8/2010 | Eberly |
| 8,518,141 B2 | 8/2013 | Schrage et al. |

FOREIGN PATENT DOCUMENTS

| | | | |
|---|---|---|---|
| CA | 1149756 A1 | 7/1983 | |
| CA | 1201389 A * | 3/1986 | .......... B01D 17/028 |
| CA | 1201389 A1 | 3/1986 | |
| CA | 2315366 A1 | 7/1999 | |
| CA | 2389065 A1 | 1/2003 | |
| CA | 2596038 A1 | 8/2006 | |
| CA | 2646949 A1 | 9/2007 | |
| CA | 2636016 A1 | 12/2009 | |
| CA | 2752912 A1 | 4/2012 | |
| WO | WO2010089786 A1 * | 7/2012 | .......... B01D 17/02 |
| WO | WO2012089786 A1 * | 7/2012 | .......... B01D 17/02 |

* cited by examiner

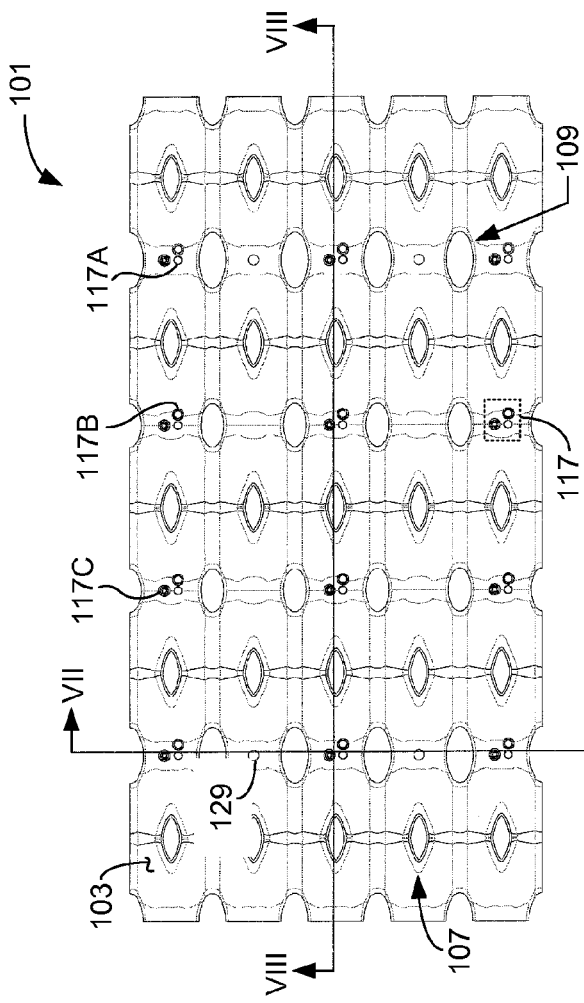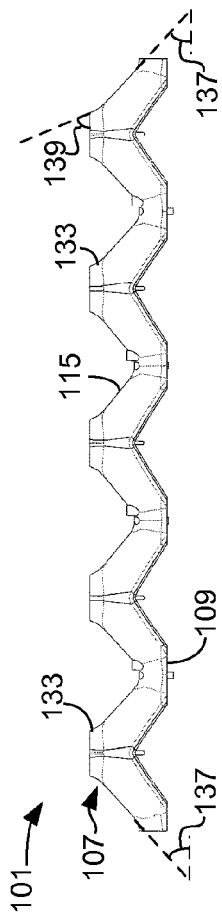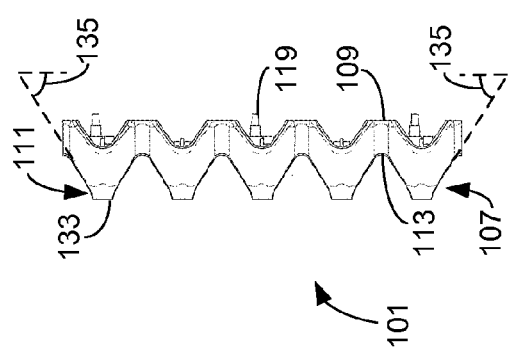

METHOD AND APPARATUS FOR SEPARATING IMMISCIBLE LIQUIDS AND SOLIDS FROM LIQUIDS

BACKGROUND

1. Field of the Invention

The present invention relates to the field of separation of oil, solid particles, and water for environmental and industrial purposes. More specifically, the invention relates to novel methods and apparatuses for separating oil and solid particles from water.

2. Description of Related Art

There is a need for economical oil water separators to process rainwater and industrial wastewater, for removing hydrocarbon and vegetable oils, and also for removing incidentally included oil from machine tool coolant. Coalescing media is often used as part of oil water separators. Coalescing media may consist of stacked plates, composed generally of plastic or other materials, which may be flat, corrugated, or angled in multiple corrugated plates. Coalescing media may be stacked either horizontally or at an angle from horizontal. The coalescing media is the part of the separator which actually captures small oil droplets to remove them from the flowing downstream, and directs the captured oil to the upper surface of the water. Typically the oil is captured on the underside of the plates according to Stokes' law by the oil droplets rising up to meet the underside of the plates and forming a film there and eventually migrates up the underside of the plates to the oil ports in the peaks of the plates. In current designs, oil does not disengage well from the plates because of the plate design. There is also a need for retrofitting existing separators with improved media to improve separation performance.

Current designs for coalescing media are not as efficient as would be desirable because current designs tend not to take into account all the flowing process conditions that may be present within a separator. For example, turbulence generated between plates hinders the migration of oil to and through the oil ports. Also, various spacings between the plates are desirable for different process reasons. Current designs typically offer two possible spacings for a given molded plate design. Each spacing relates to the relative vertical spacing between the plates. Each plate being symmetrically stacked one over the other. Such spacings fail to fully account for the efficient flowing process conditions that may be present in the separator. A system to make such installations more efficient and more cost effective is needed in the field.

Although great strides have been made in the field of separation of oil and water, considerable shortcomings remain.

BRIEF SUMMARY OF THE INVENTION

The present application describes a method and an apparatus that can be assembled in various ways to conveniently and easily make an oil water separator from an empty manhole or tank. The disclosed oil water separator may be used in either new or existing tanks. The apparatus is designed to be fastened into a vertical or horizontal cylindrical or rectangular tank.

The apparatus may be designed including a plurality of pin and socket mechanisms to allow for stacking the plates in different space arrangements.

The plates are designed with under surfaces that slope upward to allow for coalesced oil disengaging from a liquid mixture to migrate upward toward the oil ports in the top of the plates. The plates are designed with upper surfaces that slope downward to allow for solid particle disengaging from the liquid mixture to migrate downward toward the solids dump holes in the bottom of the plates.

The plates are designed with oil ramps on the undersides which are flat or nearly flat surfaces bounded by raised ribs (or fences) and not bounded on the upper and lower ends which are located on the underside of the plates. The ramps help direct the coalesced oil upward towards the oil ports.

The apparatus may be designed of polypropylene, polyoxymethylene, or other non-corrosive materials that are also suitable for the presence of hydrocarbons. These special materials are utilized to avoid corrosion or degradation of the equipment and also to enhance the coalescing of the oils on the under surface of the plates utilizing Van der Waals forces.

DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

FIG. 3 is a top view of the oil water separator plate of FIG. 1;

FIG. 7 is a section view of the oil water separator of FIG. 3 taken along the line VII-VII; and FIG. 8 is a section view of the oil water separator of FIG. 3 taken along the line VIII-VIII.

Figure 1:
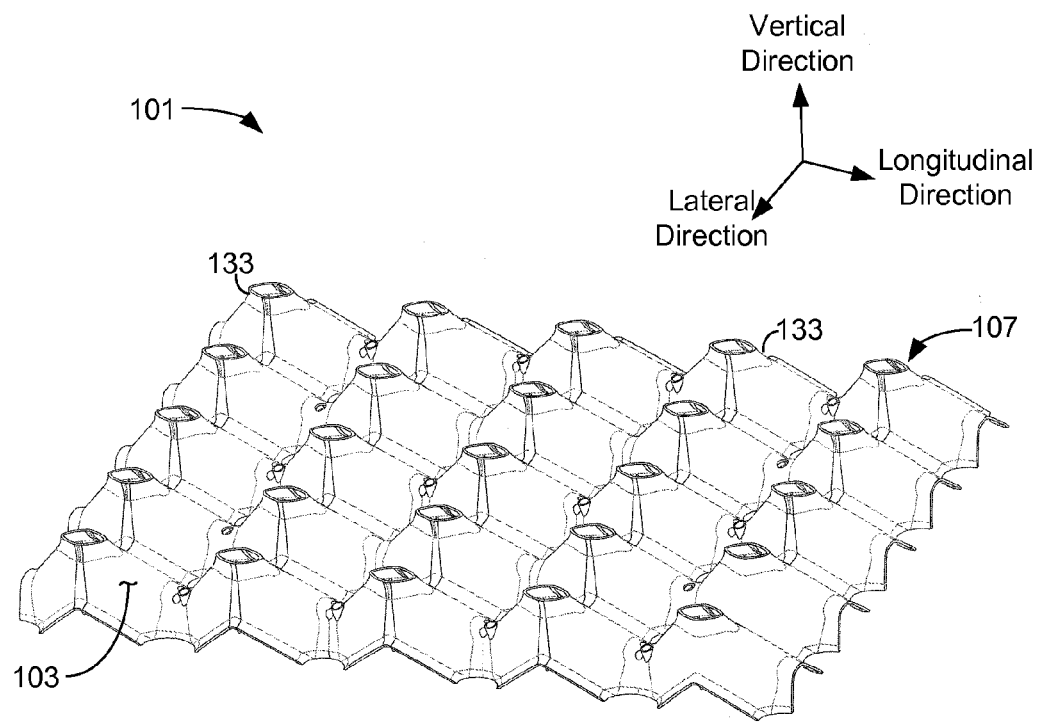
FIG. 1 is a perspective top view of an oil water separator plate according to the preferred embodiment of the present application.

While the system and method of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the preferred embodiment are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 2:
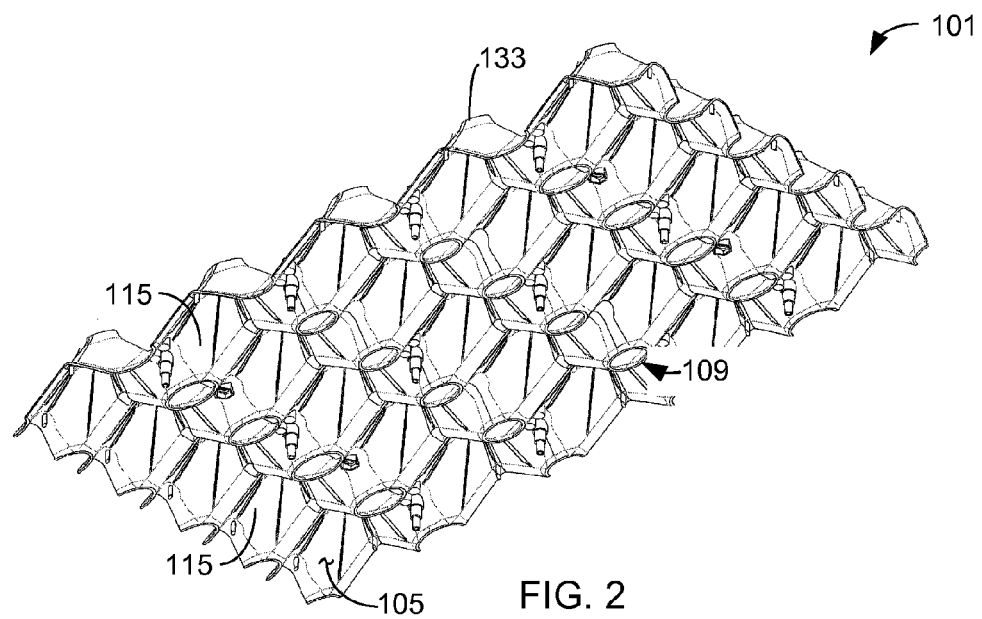
FIG. 2 is a perspective bottom view of the oil water separator plate of FIG. 1.

Referring now to FIGS. 1 and 2 in the drawings, an oil water separator plate 101 according to the preferred embodiment of the present application is illustrated. Plate 101 is stackable upon other similar plates to form a separator. Plate 101 is configured to separate immiscible liquids and solids from a water mixture. As water is passed around plate 101, immiscible liquids and solids disengage from the water mixture and contact either an upper surface 103 or a lower surface 105 of plate 101. Immiscible liquids and solids then migrate toward either an oil port 107 or a solids aperture 109 formed in plate 101. Immiscible liquids are lighter than the water mixture and therefore travel upward through the oil port 107. Conversely, solids are heavier than the water mixture and therefore travel downward through the solids aperture 109.

Plate 101 is bi-directionally corrugated orthogonally, both in a lateral direction and in a longitudinal direction, along a single horizontal plane. Bi-directional corrugation is more clearly seen in lateral and longitudinal directions from the section views of FIGS. 7 and 8. The bi-directional corrugation forms a plurality of peaks 111 and valleys 113 (as labeled in FIG. 7). A ramp 115 extends between peak 111 and neighboring valleys 113 along the bottom surface. Ramps 115 are individually associated with each peak 111 and valleys 113.

Oil port 107 is located at the peaks 111 of plate 101, having an elongated oval shape as opposed to a strict circular shape. The diameter of oil port 107 in the lateral direction is smaller than the diameter in the longitudinal direction. An elongated shape assists in decreasing turbulent water flow around oil port 107. Additionally, oil port 107 includes a tip portion 133 having a substantial vertical orientation. Tip portion 133 is integrally formed within plate 101. The transition from ramp 115 to tip portion 133 is smoothed and rounded along both upper surface 103 and lower surface 105. The smooth transition helps to increase the flow of immiscible fluid through and around oil port 107.

Solids aperture 109 is located in valley 113. Like oil port 107, aperture 109 is elliptical wherein the lateral diameter is shorter than the diameter in the longitudinal direction. Solids aperture 109 is configured to accept solids that are disengaged from, and heavier than, the working fluid. When disengaged, the solids slide along upper surface 103 into valleys 113 passing through aperture 109. Plate 101 is designed of polypropylene, polyoxymethylene, or other non-corrosive materials that are also suitable for the presence of hydrocarbons. These special materials are utilized to avoid corrosion or degradation of plate 101 and also to enhance the coalescing of the oils on lower surface 105 of the plates utilizing Van der Waals forces. These materials aid the transfer of fluids and solids through and between plates 101. The combination of the materials composed within plate 101, the use of tip 133, as well as the shape and size or port 107 and aperture 109; the risks of clogging solids and sticking immiscible liquids is greatly decreased. It is understood that each respective feature alone is useful to reduce clogging and to facilitate disengaging of immiscible liquid. As a result of increased flow and less turbulence, coalescence is increased on the underside of plate 101. In particular, the shape of port 107 is configured to allow for better droplet removal. Smaller droplets are affected more greatly by turbulence than larger droplets. Turbulence inhibits the orderly rise of small droplets according to Stokes' Law; the Law requiring laminar flow within the media to operate and any semblance of turbulence affects the rise of small droplets of immiscible liquid much more than larger droplets. When turbulence is reduced in the present system by improving streamlines within the plate system, the smaller droplets of immiscible liquid are removed resulting in a better quality of effluent. Furthermore, the inclusion of ribs or fences (as discussed later) assist in directing the flow of immiscible liquid to port 107.

It is important to note that the sizing of oil port 107 and solids aperture 109 are not critical, however, each is sized sufficiently to be able to pass immiscible liquids and solids at a high enough rate. Aperture 109 is typically larger than port 107 because solids are harder to remove via gravity than immiscible liquids.

Figure 4:
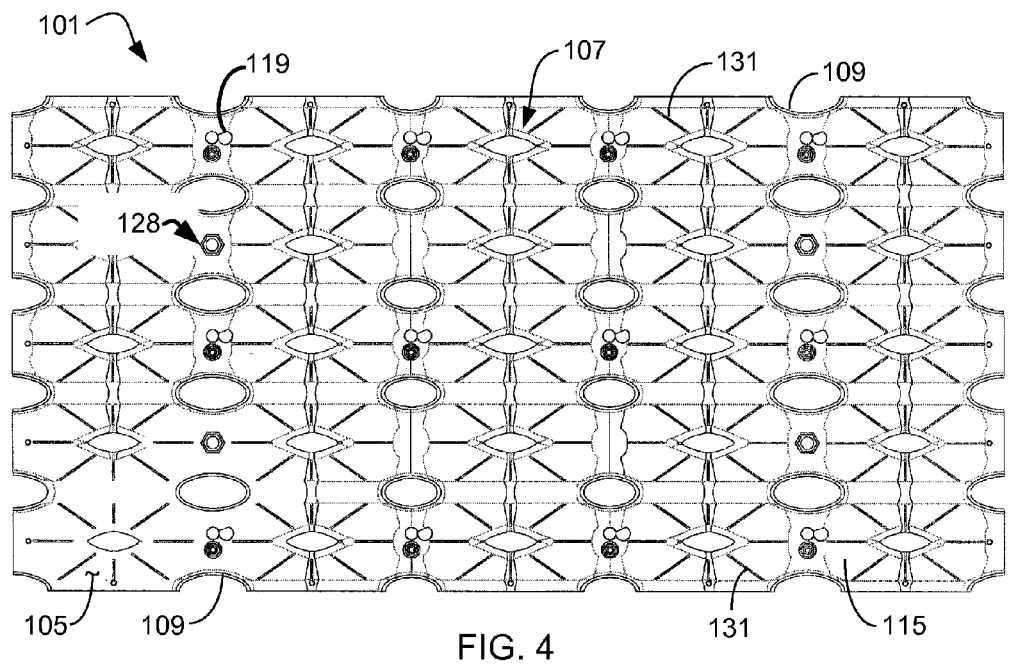
FIG. 4 is a bottom view of the oil water separator of FIG. 1.

Referring now also to FIGS. 3 and 4 in the drawings, a top and bottom view of plate 101 is illustrated, respectively. Plate 101 includes one or more sockets 117 and one or more pins 119. Sockets 117 and pin 119 are integrally formed into plate 101 along a portion of ramp 115 or valley 113. Sockets 117 are located on upper surface 103 while pins 119 extend from lower surface 105. Sockets 117 and pin 119 selectively permit the stacking orientation and alignment of adjacent plates 101 to selectively achieve different vertical spacing, lateral spacing, and longitudinal spacing between peaks 111 and valleys 113.

As seen in FIG. 3, sockets 117a, 117b, and 117c are illustrated as being hollow formations formed in the upper surface 103 of plate 101. Sockets 117 have uniform diameters, however, the diameters between individual sockets 117a, 117b, and 117c may be different. Sockets 117 are configured to accept and engage with pin 119. Pin 119 extends downward and protrudes from lower surface 105. Pin 119 is a multi-stepped protrusion, in that pin 119 decreases in diameter in stepped increments. Each stepped increment may be associated with the internal diameter of at least one of sockets 117a, 117b, and/or 117c to permit stacking. Pin 119 is hollow, therefore the internal passage acts also as corresponding socket 117b as viewed from upper surface 103.

An attaching aperture 129 is illustrated in FIG. 3. Attaching aperture 129 is used to accept fasteners, such as bolts or threaded rods, to secure plate 101 to another plate and/or a housing or other support mechanism. Plates 101 may be secured to one another through attaching aperture 129 when plates 101 are oriented such that aperture 129 of each plate is coaxially aligned. FIG. 4 illustrates a fastener head 128 in association with aperture 129. A plurality of attaching apertures 129 are typically used to ensure adequate stabilization of plates 101. For example, four attaching apertures may be used.

As seen further in FIG. 4, plate 101 also includes a rib or fence 131. Fence 131 is an elongated protrusion integrally formed along the lower surface 105 of plate 101, adjacent ramp 115. Fence 131 acts to guide or direct the flow of immiscible liquids toward and through oil port 107. Additionally, fence 131 acts as a stiffener to strengthen ramp 115. A plurality of fences 131 are associated with each oil port 107.

Figure 5:
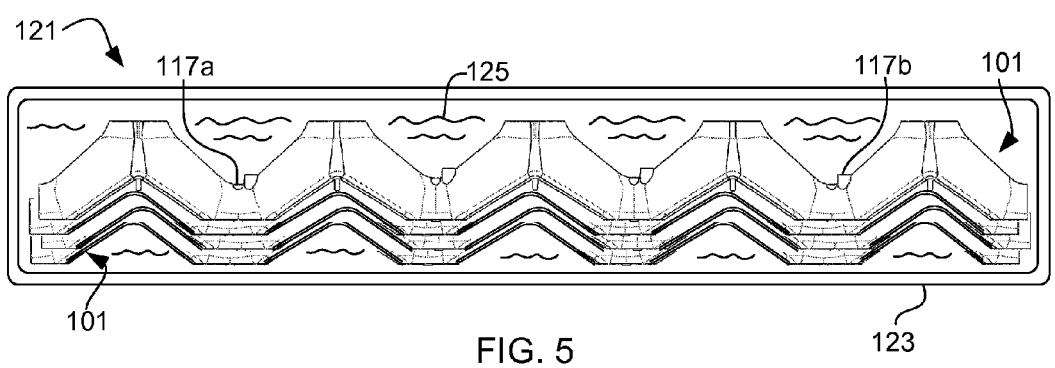
FIG. 5 is a side view of a plurality of oil water separator plates as seen in FIG. 1, stacked with longitudinal translations between each plate.
Figure 6:
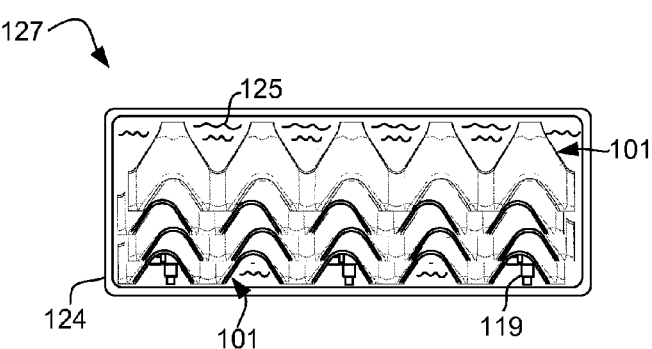
FIG. 6 is a front view of a plurality of oil water separator plates as seen in FIG. 1, stacked with lateral translations between each plate.

Referring now also to FIGS. 5 and 6 in the drawings, views of stacked plates 101 are shown in a housing 123,124 with lateral and longitudinal translations. Plate 101 may be selectively stacked with other similar plates, similar in form and features to that of plate 101. Stacking is performed in various ways to conveniently and easily make an oil water separator for use in a separator system. Each stack is selectively oriented with neighboring plates to promote efficient flowing process conditions. A plurality of stacked plates 101 may be housed in an empty manhole or tank and is sufficiently enclosed to require the water and immiscible liquid mixture to pass through the stacked configuration of plates. The disclosed oil water separator may be used in either new or existing tanks. It is understood that the tanks or housings may either fully enclose or partially enclose plates 101.

An oil water separator 121, 127 includes a housing 123, 124 that contains a plurality of plates 101 in a particular orientation. Housing 123, 124 is configured to surround and secure the stacked plates within the working mixture 125. The separator 121, 127 permits the working mixture 125 to pass between and around each plate 101. In doing so, the immiscible liquids and solids become disengaged from the working mixture 125. Each plate is stacked upon one another in a selected alignment, having a desired spacing. When multiple plates 101 are stacked in the separator, pins 119 from adjacent plates are selectively inserted into one of sockets 117a, 117b, and 117c of another plate. The choice of sockets 117 impacts the alignment and spacing between the plates. For example, by selecting between socket 117a and 117b, the alignment of the plates translate with respect to one another in the longitudinal direction. FIG. 5 illustrates a side view of plates 101 stacked in housing 123 of separator 121, the plates alternating in translation in the longitudinal direction. By selecting between sockets 117c and 117a, the alignment of the plates translate with respect to one another in the lateral direction. FIG. 6 illustrates a front view of plates 101 stacked in housing 124, the plates alternating in translation in the lateral direction. Additionally, the spacing in the vertical direction is varied depending on the selected socket 117 chosen. For example, sockets 117 are configured such that when an upper adjacent plate 101 is rotated 180 degrees and then stacked on the lower adjacent plate, the vertical spacing between the two plates will be adjusted. The spacing and alignment of the plates are selected based upon various design considerations. For example, some considerations may be the type of working mixture, the immiscible liquids and solids, and the flow rate through the separator. Although three sockets 117a, 117b, 117c have been illustrated, it is understood that more than three may be used in alternative embodiments. A sufficient number of individual sockets 117a, 117b, 117c are required to permit the translation of the plates in the entire horizontal plane.

Referring now also to FIGS. 7 and 8 in the drawings, respective side and front section views of plate 101 are illustrated. In FIGS. 7 and 8, oil port 107 is shown in more detail. Tip portion 133 is a transition and extension from ramp 115. Tip portion 133 defines the shape and size of oil port 107. Tip portion 133 transitions from the slope of ramp 115 to a more vertical orientation with respect to the horizontal. As illustrated in FIG. 7, the portions of ramp 115 running approximately in the longitudinal direction are illustrated. These portions of ramp 115 are angled from the horizontal at a respective longitudinal ramp angle 135. As illustrated in FIG. 8, the portions of ramp 115 running approximately in the lateral direction are illustrated. These portions of ramp 115 are angled from the horizontal at a respective lateral ramp angle 137. Tip portion 133 is angled with respect to the horizontal by an oil port angle 139. Angle 139 is greater than angles 135 and 137.

Although angle 139 is not depicted as being vertical, it is understood that angle 139 is greater than angles 135 and 137 and may be at least perpendicular with the horizontal. Additionally, angles 135 and 137 are not the same in the preferred embodiment. Other embodiments may increase or decrease either angle 135 or 137 as desired based upon design considerations. Furthermore, the lateral angle 137 and longitudinal angle 135 of each ramp on plate 101 may be varied along the width and/or length of plate 101.

The current application has many advantages over the prior art including the following: (1) walls come to a substantially vertical orientation at oil ports along each crest; (2) reduced turbulent flow along each plate by using an elongated or elliptical oil port shape; (3) focused oil flow along the underside of each plate through the use of a plurality of fences; and (4) horizontal offset permitting translation in the entire horizontal plane to selectively tailor and improve flow characteristics between each plate.

The particular embodiments disclosed above are illustrative only, as the application may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

What is claimed is:

1. An oil water separator plate for separating immiscible liquids and solids from a mixture, comprising:
    a bi-directional corrugation extending in both a lateral direction and a longitudinal direction, the bi-directional corrugation forming a plurality of peaks and valleys, a ramp radially extending around the circumference of each peak at a first angle with respect to a horizontal, said ramp having an upper and lower surface;
    an oil port formed in each peak of the bi-directional corrugation for passing of the immiscible liquids, the oil port including a tip portion extending at a second angle with respect to the horizontal, the second angle being greater than the first angle;
    a ramp formed on the lower surface of the ramp for directing a flow of the immiscible liquids to the oil port, the fence being an elongated protrusion integrally formed on the lower surface of the ramp; and
    a solids aperture formed in each valley of the bi-directional corrugation for passing the solids.

2. The oil water separator plate of claim 1, wherein the oil port is an elongated circle configured to minimize turbulence.

3. The oil water separator plate of claim 1, wherein the oil water separator plate is formed of non-corrosive materials suitable for the presence of hydrocarbons.

4. The oil water separator plate of claim 1, wherein the bi-directional corrugations are oriented orthogonally to one another.

5. The oil water separator plate of claim 1, wherein the first angle is 45 degrees.

6. The oil water separator plate of claim 1, further comprising:
    a multi-step pin; and
    a plurality of sockets;

wherein the multi-step pin and the plurality of sockets are configured for selective insertion of the multi-step pin onto the plurality of sockets of the oil water separator plate in the lateral direction and the longitudinal direction.

7. The oil water separator plate of claim 6, wherein the multi-step pin is hollowed, thereby forming one of the plurality of sockets.

8. An oil water separator for separating immiscible liquids and solids from a mixture, comprising:
   a first separator plate having a plurality of sockets, the first separator plate including a ramp and a fence, the ramp extending between an oil port and a solids aperture at an angle relative to a horizontal, the ramp radially extending around the circumference of each oil port and solids aperture, said ramp having an upper and lower surface, the fence formed on the lower surface of the ramp for directing a flow of the immiscible liquids, the fence being an elongated protrusion integrally formed on the lower surface of the ramp;
   a second separator plate having a pin configured to engage one of the plurality of sockets, so as to stack the second separator plate relative to the first separator plate; and
   a housing configured to surround the first separator plate and the second separator plate within the mixture;
   wherein each separator plate is configured to separate the immiscible liquids from the solids in the mixture; and
   wherein the plurality of sockets and the pin are configured to permit the selective spacing of the first separator plate in relation to the second separator plate in a vertical direction as well as the selective alignment of each separator plate in a lateral direction and a longitudinal direction.

9. The oil water separator of claim 8, wherein the first separator plate and the second separator plate have a bi-directional corrugation extending in both the lateral direction and the longitudinal direction.

10. The oil water separator of claim 9, further comprising:
   wherein the oil port is configured to permit that passage of the immiscible liquids, the oil port including a tip portion extending at a second angle with respect to the horizontal, the second angle being greater than the first angle; and
   wherein the solids aperture is located on a plane offset from that of the oil port and is configured to permit the passage of the solids from the first separator plate to the second separator plate.

11. The oil water separator of claim 10, wherein the oil port is an elongated circle configured to minimize turbulence as the mixture passes between the first separator plate and the second separator plate.

12. The oil water separator of claim 9, wherein the upper surface of the ramp is sloped to allow for the solids to pass toward the solids aperture; and
   wherein the lower surface of the ramp is sloped to allow for the immiscible liquids to rise toward the oil port.

13. The oil water separator of claim 8, wherein the pin has a plurality of steps, each step having a different diameter;
   wherein each socket of the plurality of sockets has a different diameter; and
   wherein the vertical spacing is adjusted by selectively engaging the plurality of steps with the plurality of sockets.

14. The oil water separator of claim 8, wherein the housing is at least one of a manhole and a tank.

15. A method of separating immiscible liquids and solids from a mixture, comprising:
   orienting a first oil water separator plate in relation to a second oil water separator plate, the first oil and water separator plate and the second oil and water separator plate being selectively oriented in a vertical direction, a lateral direction, and a longitudinal direction, the first oil and water separator plate and second oil and water separator plate being located in a housing, the first oil and water separator plate includes:
      a ramp extending between an oil port and a solids aperture at an angle relative to a horizontal, the ramp radially extending around the circumference of an oil port and a solids aperture, said ramp having an upper and lower surface, and
      a fence formed on the lower surface of the ramp for directing a flow of the immiscible liquids to the oil port, the fence being an elongated protrusion integrally formed on the lower surface of the ramp;
   stacking the second oil and water separator plate in relation to the first oil and water separator plate; and
   passing the mixture within the housing between the first oil and water separator plate and the second oil and water separator plate, such that the immiscible liquids and solids are separated from the mixture and pass through at least one of the solids aperture and the oil port.

16. The method of claim 15, wherein the oil port includes a tip portion oriented vertically to increase the flow of immiscible liquid through the oil port.

17. The method of claim 15, further comprising:
   adjusting the orientation of the first oil and water separator plate to that of the second oil and water separator plate to adjust the flow characteristics of the mixture.

* * * * *